US010632897B2

(12) United States Patent
Hübner et al.

(10) Patent No.: US 10,632,897 B2
(45) Date of Patent: Apr. 28, 2020

(54) ALIGNMENT ELEMENT FOR POSITIONING AN ATTACHMENT PART (71) Applicants: Volkswagen Aktiengesellschaft, Wolfsburg (DE); Böllhoff Verbindungstechnik GmbH, Bielefeld (DE)

(72) Inventors: Torsten Hübner, Wolfsburg (DE); Andreas Borsutzky, Lehre (DE); Martin Jodeleit, Bielefeld (DE)

(73) Assignees: Volkswagen Aktiengesellschaft, Wolfsburg (DE); Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 16/073,140

(22) PCT Filed: Jan. 24, 2017

(86) PCT No.: PCT/EP2017/051384
§ 371 (c)(1),
(2) Date: Jul. 26, 2018

(87) PCT Pub. No.: WO2017/129544
PCT Pub. Date: Aug. 3, 2017

(65) Prior Publication Data
US 2019/0031083 A1 Jan. 31, 2019

(30) Foreign Application Priority Data
Jan. 29, 2016 (DE) .................. 10 2016 101 634

(51) Int. Cl.
*B60Q 1/04* (2006.01)
*B60Q 1/26* (2006.01)
(Continued)

(52) U.S. Cl.
CPC .......... *B60Q 1/045* (2013.01); *B60Q 1/0433* (2013.01); *B60Q 1/2626* (2013.01);
(Continued)

(58) Field of Classification Search
CPC .... B60Q 1/045; B60Q 1/0433; B60Q 1/2626; B60Q 1/2638; F16B 35/005; F16B 5/0233
See application file for complete search history.

(56) References Cited

U.S. PATENT DOCUMENTS

| 8,337,132 | B2 | 12/2012 | Steffenfauseweh et al. |
| 2012/0134740 | A1* | 5/2012 | Halder ............. F16B 35/005 403/113 |
| 2014/0212202 | A1* | 7/2014 | Brueckner ......... B62D 65/024 403/14 |

FOREIGN PATENT DOCUMENTS

| DE | 10 98 468 B | 2/1961 |
| DE | 87 13 935 U1 | 12/1987 |

(Continued)

OTHER PUBLICATIONS

Search report for German Patent Application No. 10 2016 101 634.9, dated Oct. 5, 2016.
(Continued)

*Primary Examiner* — Mary Ellen Bowman
(74) *Attorney, Agent, or Firm* — Pearl Cohen Zedek Latzer Baratz LLP (57) ABSTRACT The invention relates to an alignment element (10), with which an attachment part (50) can be positioned on a structure part (42) of a motor vehicle. The alignment element (10) is also suitable for retaining the attachment part (50) at a defined distance to the structure part (42) under non-destructive force transmission, and for compensating an occurring angular adjustment (W). The invention also relates to an illumination assembly (28) for a vehicle having (Continued)

the alignment element (10) and a corresponding method for mounting an illumination device (34) on the vehicle. Finally, a vehicle (32) comprising the illumination assembly (28) is also an object of the invention.

9 Claims, 5 Drawing Sheets

(51) Int. Cl.
    *F16B 35/00*      (2006.01)
    *F16B 5/02*      (2006.01)

(52) U.S. Cl.
    CPC .......... *B60Q 1/2638* (2013.01); *F16B 35/005* (2013.01); *F16B 5/0233* (2013.01)

(56) References Cited

FOREIGN PATENT DOCUMENTS

| | | |
|---|---|---|
| DE | 199 26 842 A1 | 12/2000 |
| DE | 101 21 114 A1 | 10/2002 |
| DE | 20 2005 005 725 U | 6/2005 |
| DE | 20 2005 008 060 U | 7/2005 |
| DE | 20 2007 016 945 U | 5/2008 |
| EP | 0 393 353 A1 | 10/1990 |
| EP | 1 561 638 A2 | 8/2005 |
| EP | 2 442 945 A1 | 4/2012 |
| FR | 2609763 A1 | 7/1988 |
| FR | 2 971 565 A1 | 8/2012 |
| FR | 2971565 A1 * | 8/2012 ............ F16B 5/0283 |
| WO | WO 2010 145647 A1 | 12/2010 |

OTHER PUBLICATIONS

International Search Report of PCT Application No. PCT/EP2017/051384, dated Mar. 20, 2017.

* cited by examiner

ALIGNMENT ELEMENT FOR POSITIONING AN ATTACHMENT PART

CROSS-REFERENCE TO RELATED APPLICATIONS

This application is a National Phase Application of PCT International Application No. PCT/EP2017/051384, International Filing Date Jan. 24, 2017, claiming priority of German Patent Application No. 10 2016 101 634.9, filed Jan. 29, 2016, which is hereby incorporated by reference.

FIELD OF THE INVENTION

The invention relates to an adjustment element for positioning an attachment part on a structural part of a vehicle, to an illumination arrangement having the adjustment element, to a method for assembling an illumination apparatus in a vehicle, and to a motor vehicle having the illumination arrangement.

BACKGROUND OF THE INVENTION

In the final assembly of vehicles, it is necessary, for example, to position and to orient those components and assemblies which form the surface of the vehicle relative to one another. Said operation is called adjustment and takes place in the case of many joining operations along the entire value chain of the vehicle.

There are assemblies, for example illumination apparatuses, which become a constituent part of the surface of the vehicle. An illumination apparatus of this type can be, for example, a headlight assembly or a tail light which is arranged in a receiving section of the surface of the vehicle during the assembly. The aim here is to maintain narrow tolerances, inter alia with regard to gap sizes between the headlight assembly or tail light and adjoining trim parts of the surface of the vehicle. There are also narrow tolerances here in terms of the completion of the surface of the vehicle by way of the surface of the headlight assembly or tail light. An excessively great offset would lead to a discernible step here within the surface of the vehicle.

A wide variety of technical solutions which fulfill the above-described requirements are already known to a person skilled in the art. It is thus known, for example, to arrange the illumination apparatus in the receiving section of the surface of the vehicle and to fasten the illumination apparatus to a structural part of the vehicle. For example, one or more adjustment elements which hold the illumination apparatus at a spacing from the surface of the vehicle at defined points can then be provided for the subsequent adjustment. By way of the setting of the adjustment elements, the illumination apparatus can then be moved relative to the surface of the vehicle until the desired adjustment state is established.

It is necessary here that the adjustment elements bear against the structural part of the vehicle at the defined points in order to support the illumination apparatus. It proves problematic that local damage of the structural part frequently occurs at said points on account of the permanent introduction of force and the resulting continuous loading of said structural part. Corrosion effects occur here as an undesired result, which corrosion effects can be attributed for example to damage of a protective paint surface which is applied on the structural part.

DE 87 13 935 U1 discloses an apparatus for the adjustable connection of a vehicle headlight with a supporting part. Said apparatus has a holding flange which can be introduced into a cutout of the supporting wall.

Furthermore, DE 199 26 842 A1 discloses a vehicle light with an adjustable fastening means. Here, a threaded bolt is guided through a bore in a vehicle body and can thus hold the vehicle light at a spacing from the vehicle body.

Furthermore, EP 0 393 353 A1 describes a headlight for vehicles. A reflector of the headlight is connected adjustably to a receiving part. The connection to the receiving part is established via two connecting parts which are introduced in each case into a bore of the receiving part and are fastened in the latter as a result.

DE 101 21 114 A1 describes a vehicle light with an adjustable fastening means. Here, the adjustability is provided via a threaded bolt which can bear against a vehicle structure in the direction of the adjustability.

DE 20 2007 016 945 U1 describes a further adjusting element for positionably fastening a component, for example a vehicle light, in three-dimensional space.

Finally, DE 20 2005 008 060 U1 discloses a fastening arrangement for adjustably fastening a housing part to a carrier part with the possibility of a compensation of tolerances. The arrangement comprises a sleeve and a bolt-shaped fastening element which can be screwed into the sleeve. Furthermore, the arrangement has a housing part with ribs, into which a head of the sleeve is latched, and in the case of which the sleeve and the housing part form a rigid combination in the longitudinal direction.

SUMMARY OF THE INVENTION

The invention is then based on the object of providing an adjustment element for positioning an attachment part on a structural part of a vehicle, in the case of which the structural part does not experience any damaging influence as a result of the adjustment of the attachment part.

The object is achieved by way of the subjects of the independent patent claims. Further preferred refinements of the invention result from the remaining features which are mentioned in the dependent claims.

A first aspect of the present invention relates to an adjustment element for positioning an attachment part on a structural part of a vehicle having an adjustment section which can be connected to the attachment part, and having a bearing section. It is provided according to the invention that the bearing section is mounted movably on the adjustment section and has a supporting face which can bear against the structural part of the vehicle.

The adjustment section makes a setting of geometric properties of the adjustment element possible, such as its length. Within the context of the invention, the attachment part can be any desired attachment part which is required to complete the vehicle. In particular, this relates to attachment parts which are provided for a region of the surface of the vehicle. In conjunction with the invention, attachment parts in the form of illumination apparatuses are to be particularly emphasized. Within the context of the invention, the structural part can accordingly be any desired structural part which is suitable to act as a rest, reference or the like for the purpose of positioning of the attachment part. In particular, this relates to structural parts in regions closely below the surface of the vehicle. In conjunction with the invention, structural parts in the form of vehicle body parts are to be particularly emphasized.

The adjustment element according to the invention affords the advantage that any forces which are transmitted to the structural part via the adjustment element are transmitted to the structural part as a distributed load on account of the supporting face. This preserves the material of the structural part and avoids wear as a consequence of great continuous loading. In this way, a substantial cause of corrosion damage is eliminated. Since the bearing section which has the supporting face is mounted movably on the adjustment section, it is advantageously ensured that said bearing section can bear completely against the structural part. Here, the relative orientation of the adjustment element and the structural part is irrelevant. In other words, this is achieved by the bearing section being mounted movably on the adjustment section in such a way that the supporting face can be pivoted with respect to the adjustment section. In other words, furthermore, the movability between the bearing section and the adjustment section allows positioning of the supporting face with respect to the adjustment section in such a way that a normal vector of the supporting face with respect to an axis, for example the longitudinal axis, of the adjustment section can assume different angular relationships. In this way, flat bearing of the supporting face is ensured even in the case of structural parts which are twisted per se or are afflicted by production tolerances. A spacing between the structural part and the attachment part can advantageously be set flexibly, reliably and precisely via the adjustment section. It is thus possible, for example, to first of all bring the supporting face of the bearing section of the adjustment element to bear against the structural part under prestress and then to set the adjustment section and thus, for example, to modify the length of the adjustment element, in order to produce the desired adjustment state between the attachment part and the structural part.

It is provided in one preferred refinement of the invention that the bearing section is fastened to the adjustment section via a resilient connection.

This affords the advantage that the adjustment section and the bearing section can be oriented relative to one another simply and flexibly. In particular, a very wide variety of angular positions relative to one another can be realized, since a resilient connection is subject to fewer geometric boundary conditions than, for example, an articulated connection. Manufacturing tolerances can also be compensated for simply by way of the resilient connection. Furthermore, a resilient connection can be produced simply. For example, the adjustment section and the bearing section can be produced in one piece with respect to one another. Suitable materials, such as plastic, are known to a person skilled in the art.

It is provided in a further preferred refinement of the invention that the bearing section is fastened to the adjustment section via an articulated connection.

This affords the advantage that the articulated connection can be designed for a high stiffness. In this way, if the supporting face bears against the structural part, high forces can be transmitted from the structural part via the supporting face and the bearing section to the adjustment section and then to the attachment part, without the adjustment element yielding. The adjustment element thus becomes significantly more resistant to thermal and mechanical environmental influences, such as vibrations or waste heat. In this refinement, the adjustment section and the bearing section can also be called a serial kinematics system in other words. In the case of an articulated connection, the movability of the bearing section with respect to the adjustment section can also be considered to be a spatial displaceability of the bearing section with respect to the adjustment section, in relation to the respective centers of mass of said elements, since the relative position of the two centers of mass can be changed with respect to one another. Therefore, the above-described pivoting of the supporting face with respect to the adjustment section can result, for example, from the displacement of the bearing section overall.

It is provided in a further preferred refinement of the invention that the articulated connection comprises a joint body receptacle and a slidable joint body which is complementary with respect to said joint body receptacle.

The articulated connection can be, for example, a ball joint connection. The slidable joint body is then, for example, a joint ball, and the joint body receptacle is, for example, a joint socket. Articulated connections of this type can advantageously be produced simply and at the same time afford a great degree of movability. In addition, the selection of suitable materials, such as plastic, can ensure that additional lubrication can be dispensed with and the articulated connection can be produced simply and inexpensively.

It is provided in a further preferred refinement of the invention that the adjustment section comprises a sleeve which can be connected to the attachment part, and a supporting body which can be adjusted with respect to the sleeve and on which the bearing section is mounted.

This affords the advantage that the adjustment element is of very simple construction and at the same time makes all necessary functions possible.

It is provided in a further preferred refinement of the invention that the sleeve has an internal thread and the supporting body has an external thread.

This advantageously makes a simple, precise and reliable adjustment of the sleeve and the supporting body relative to one another possible.

It is provided in a further preferred refinement of the invention that the sleeve can be connected to the attachment part in a positively locking and/or non-positive or integrally joined manner. For example, the sleeve can have an external thread or an outer circumferential face, via which it can be introduced into the attachment part and can then be adhesively bonded to the latter, for example. A clip connection is also possible as a further example.

In this way, a reliable connection can advantageously be ensured between the sleeve and the attachment part. In the case, for example, of a screw or clip connection, the connection is additionally releasable and is therefore flexible in the case of replacement parts.

A second aspect of the invention relates to an illumination arrangement for a vehicle, comprising at least one adjustment element according to the invention. In this case, the above-referenced attachment part is an illumination apparatus for a vehicle. The structural part of the vehicle, on which structural part the illumination apparatus is positioned, can be, for example, a vehicle body part or else any other suitable structural part here.

The illumination arrangement according to the invention affords advantages which are supported on the above-described advantages of the adjustment element according to the invention. For instance, any forces which are transmitted via the adjustment element to the structural part are transmitted as a distributed load to the structural part on account of the supporting face of the adjustment element. This preserves the material of the structural part and avoids wear as a consequence of continuous loading. In this way, a substantial cause of corrosion damage is eliminated. Since the bearing section which has the supporting face is mounted movably on the adjustment section, it is advantageously ensured that said bearing section can bear completely against the structural part. Here, the relative orientation of the adjustment element and the structural part is irrelevant. This is important, in particular, during the assembly of vehicles. Here, the illumination apparatus has to be incorporated into the external visible overall appearance of the vehicle with the maintenance of tightly dimensioned tolerances. Here, the precise relative end position between the illumination apparatus and the structural part, for example a vehicle body part, is scarcely foreseeable. Corresponding difficulties also arise in the case of structural parts which are twisted per se or are afflicted with production tolerances. This can be compensated for by way of the bearing section which is mounted movably on the adjustment section, with the result that the supporting face of the adjustment element always bears reliably and flatly against the structural part. A spacing between the structural part and the illumination apparatus can advantageously be set flexibly, reliably and precisely via the adjustment section. It is thus possible, for example, to first of all bring the supporting face of the bearing section of the adjustment element to bear against the structural part under prestress and then to set the adjustment section and thus, for example, to change the length of the adjustment element, in order to produce the desired adjustment state between the illumination apparatus and the structural part. Therefore, the adjustment element makes a setting of the position and orientation (comprising the spacing and the angular rotation) of the illumination apparatus relative to the structural part or the vehicle body part possible.

It is provided in one preferred refinement of the invention that, furthermore, the illumination arrangement comprises the following features: the illumination apparatus which can be arranged in a receiving section of a surface of the vehicle, a mount, via which the illumination apparatus is mounted on the vehicle such that it can be moved in at least one degree of freedom, and can be moved at least in sections in the direction of the surface of the vehicle or away from said surface, and the adjustment element, the adjustment section of which is connected to the illumination apparatus and the supporting face of which can bear against the structural part of the vehicle.

In other words, the surface of the vehicle is an enveloping surface which delimits the vehicle with respect to its environmental system. Purely by way of example, said enveloping surface can be formed by way of vehicle body elements, windows and other components and assemblies which delimit the vehicle with respect to its environmental system. Accordingly, the term of "receiving section" denotes the surface which is provided for the arrangement of a defined component or a defined assembly, with the result that it completes the surface of the vehicle in the receiving section. Within the context of the invention, an assembly of this type is, in particular, an illumination apparatus. Within the context of the invention, illumination apparatuses can be front headlights, tail lights or other illumination apparatuses which are known to a person skilled in the art. The structural part of the vehicle lies at least in sections below the surface of the vehicle. The structural part can also form the surface of the vehicle in sections. The term "structural part" also implies structures which consist of a plurality of parts. The structural part is preferably a body part of the vehicle, which body part is visible in the receiving section of the surface if the illumination apparatus has not yet been arranged in the receiving section. In conjunction with the present invention, the structural part can also serve to secure the illumination apparatus. The illumination apparatus can also be positioned on the structural part, however, and can be fastened to the vehicle at another point.

The illumination apparatus is fastened to the vehicle via the mount and can be moved here in at least one degree of freedom. The mount can be, for example, a pivotable articulated connection. In this case, the illumination apparatus would be capable of being pivoted about the mount at least in one degree of rotational freedom. The mount can also be a plug connection, however, which makes a translational movement of the illumination apparatus possible, for example via bolts or pins. Movability of the illumination apparatus in the direction of the surface of the vehicle means that the illumination apparatus is moved toward a region which lies behind the surface. This can be, for example, an interior space of the vehicle. Movement of the illumination apparatus away from the surface of the vehicle means, in contrast, that the illumination apparatus is moved further away from the region which lies behind the surface. In addition to the interior space of the vehicle, this can also be the structural part, such as the vehicle body part, purely by way of example.

It is provided in one preferred refinement of the invention that the illumination arrangement comprises an energy store element which is configured to apply a prestressing force to the illumination apparatus, which prestressing force acts in the direction of the surface of the vehicle.

Purely by way of example, the energy store element can be a spring or a torsion spring. In the case of a torsion spring, a "prestressing moment" can be mentioned instead of the term "prestressing force". A precise terminological differentiation between the prestressing force and the prestressing moment is unnecessary, however. In conjunction with the present invention, it is decisive merely that it can be brought about by way of the energy store element that the prestressing force accelerates the illumination apparatus overall or locally in the direction of the surface of the vehicle. Thus, every prestressing moment which is applied to the illumination apparatus via a certain lever arm on the illumination apparatus always emerges again as a local prestressing force. The prestressing force can be transmitted to the structural part via the adjustment element. This therefore results in a closed force flow, via the energy store element, the mount, the illumination apparatus, the adjustment element, the structural part, and, via the latter or possibly via further regions of the vehicle, back to the energy store element.

This affords the advantage that the adjustment element can be held permanently in a position, in which the supporting face bears against the structural part. In this state, the adjustment element can be set particularly satisfactorily.

A third aspect of the present invention relates to a method for assembling an illumination apparatus in a vehicle, at least comprising the steps:
a) pre-assembly of an illumination arrangement for a vehicle in accordance with the present invention;
b) bearing of a supporting face of a bearing section of an adjustment element according to the invention of the illumination arrangement against a structural part of the vehicle; and
c) setting of the adjustment section.

The sequence of steps b and c can be selected as desired.

The method according to the invention affords the advantage that the illumination apparatus can be assembled simply, rapidly and securely on the vehicle.

A further aspect of the present invention relates to a motor vehicle, comprising at least one illumination arrangement according to the invention.

A motor vehicle of this type affords the advantage that it has a particularly clean and uniform external appearance. In particular, gap sizes between the parts and assemblies which form the surface of the motor vehicle can be set particularly satisfactorily by way of the illumination arrangement according to the invention. Furthermore, the quality of the motor vehicle according to the invention is increased significantly. Corrosion is one of the main problems in the operating phase in the automotive sector. By way of the illumination arrangement according to the invention, a weak point of conventional motor vehicles is eliminated in the case of the motor vehicle according to the invention.

The different embodiments of the invention which are mentioned in this application can be combined advantageously with one another, unless stated otherwise in the individual case.

BRIEF DESCRIPTION OF THE DRAWINGS

In the following text, the invention will be described in greater detail in exemplary embodiments using the associated drawings, in which.

DETAILED DESCRIPTION OF THE INVENTION

Figure 1:
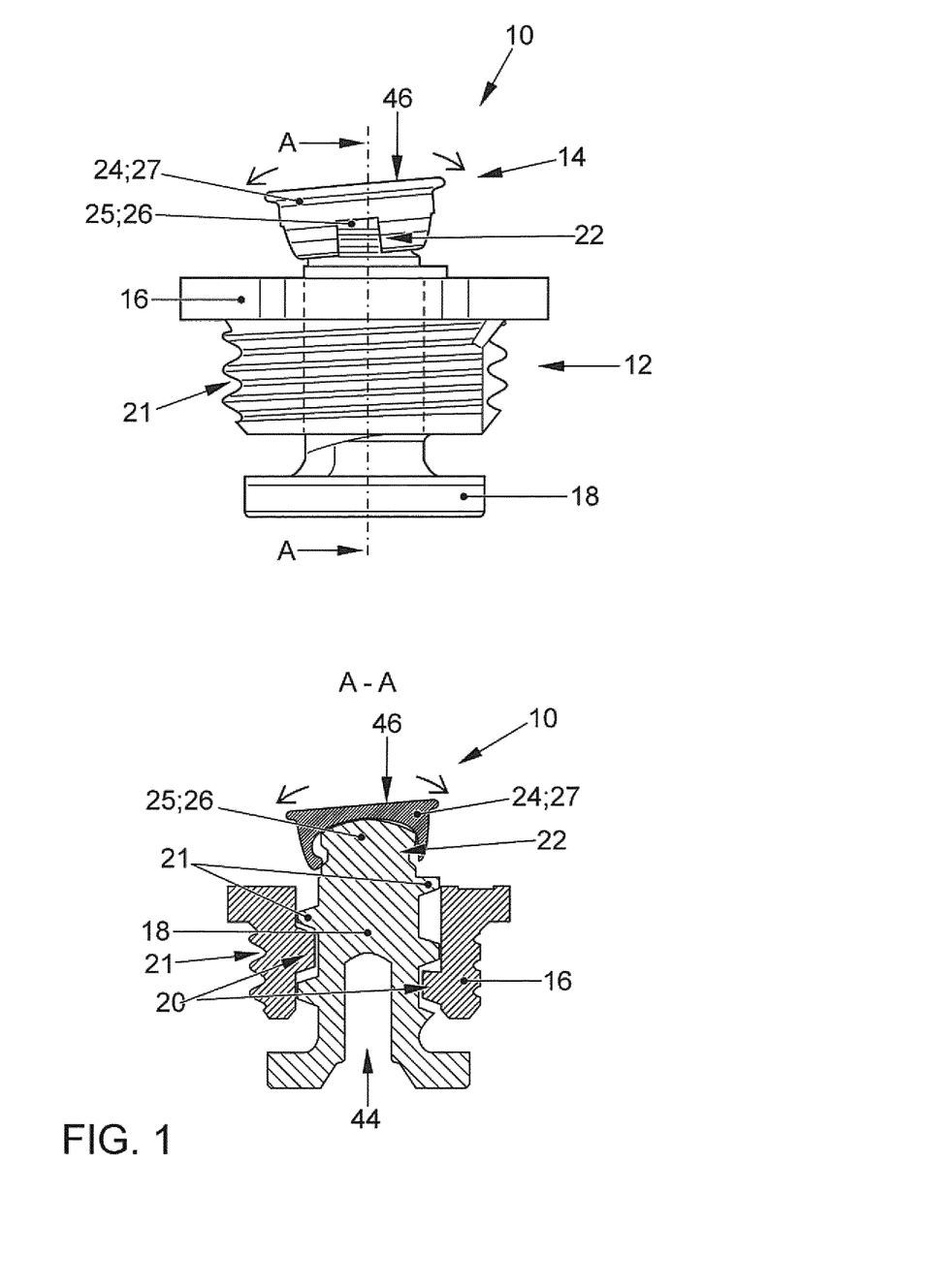
FIG. 1 shows a diagrammatic illustration of an adjustment element according to the invention in one preferred embodiment.
Figure 4:
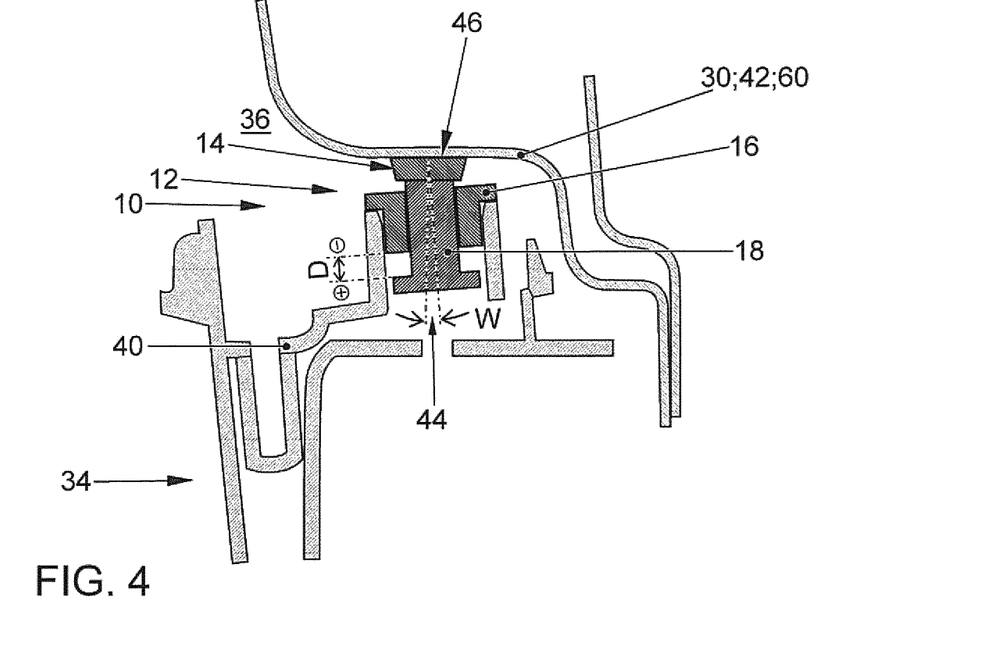

FIG. 1 shows an adjustment element 10 according to the invention in one preferred embodiment. The adjustment element 10 comprises an adjustment section 12 and a bearing section 14 which can be moved with respect to the adjustment section 12 and has a supporting face 46. By virtue of the fact that the bearing section 14 is movable with respect to the adjustment section 12, the supporting face 46 is capable of assuming different angular relationships with respect to a longitudinal axis of the adjustment section 12. In FIG. 1, said longitudinal axis corresponds to the sectional line A-A. This possibility of the supporting face 46 of assuming different angular relationships with respect to a longitudinal axis of the adjustment section 12 can also be considered to be a pivotability of the supporting face 46 with respect to the adjustment section 12. If, for example, FIG. 4 is considered in this regard, it becomes clear that said angular relationships which the supporting face 46 is capable of assuming with respect to a longitudinal axis of the adjustment section 12 serve to compensate for an undesired angular adjustment W (more detailed information in the description which follows further below).

The adjustment section 12 comprises a sleeve 16 and an adjustable supporting body 18. The adjustable supporting body 18 can be adjusted longitudinally with respect to the sleeve 16. For this purpose, the sleeve 16 has an internal thread 20 and the adjustable supporting body 18 has an external thread 21. The sleeve 16 and the adjustable supporting body 18 therefore form a type of screw connection. The adjustment element 10 is adjustable, by the adjustable supporting body 18 being screwed into or out of the sleeve 16. For this purpose, a corresponding tool holder 44 is provided. The bearing section 14 is mounted movably on the adjustment section 12 via an articulated connection 22. The articulated connection comprises a slidable joint body 24 and a joint body receptacle 26. The slidable joint body 24 is configured as a joint socket 27 in this exemplary embodiment, and the joint body receptacle 26 is configured as a joint head 25. The joint socket 27 is a constituent part of the bearing section 14. The joint socket 27 can be displaced freely on the joint head 25 and is held by the latter via a clip connection. The free displaceability is restricted merely by virtue of the fact that the joint socket 27 produces a disruptive contour with respect to the joint head 25, and vice versa. The bearing section 14 has a supporting face 46 in the region of the slidable joint body 24 or the joint socket 27. Said supporting face 46 can bear against a structural part 42 (not shown here) of a vehicle (cf. FIGS. 3-5). Via the external thread 21, the sleeve 16 can be connected to an attachment part 50 (not shown here) (cf. FIGS. 3-5).

Figure 2:
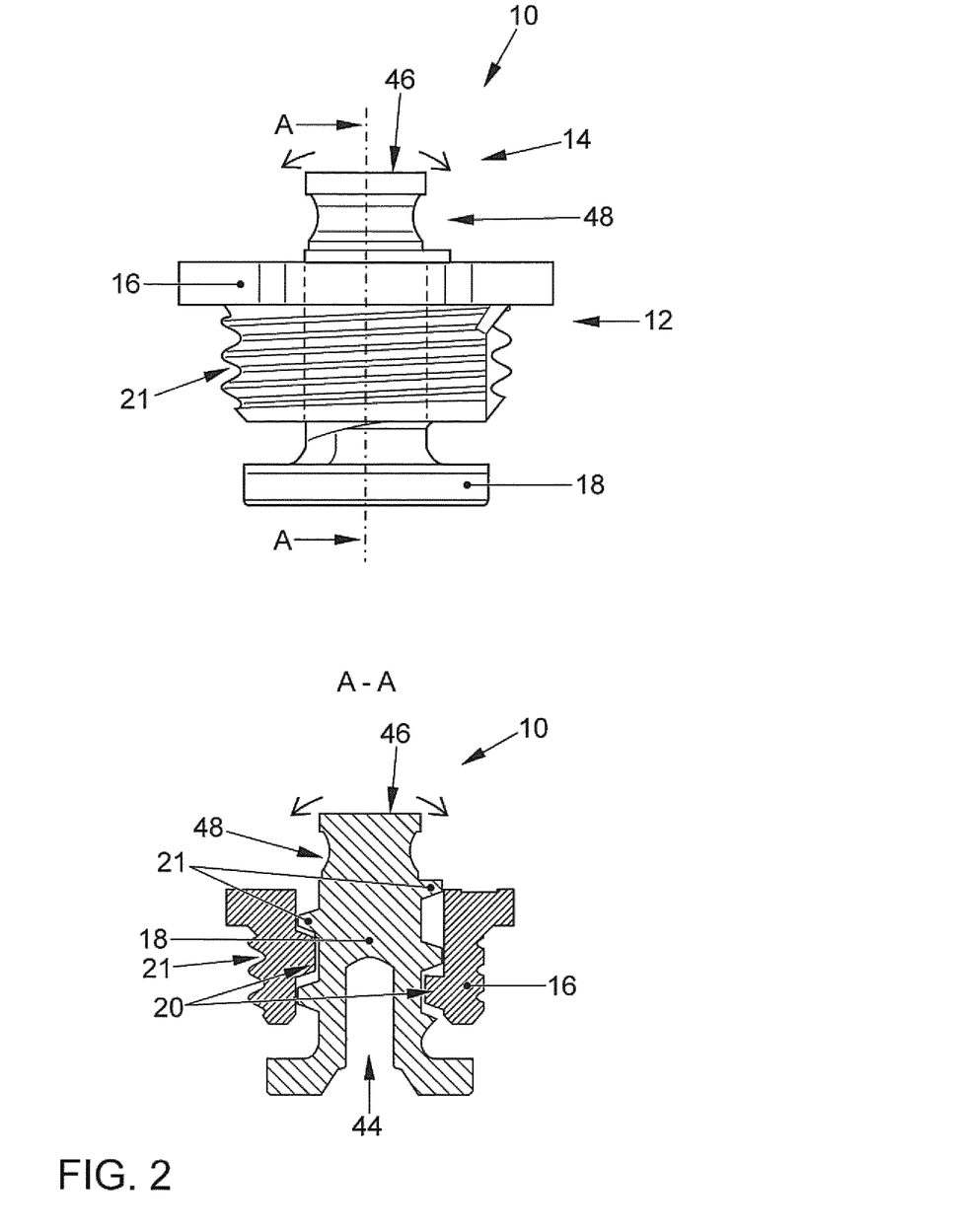
FIG. 2 shows a diagrammatic illustration of an adjustment element according to the invention in an alternative preferred embodiment.

FIG. 2 shows an adjustment element 10 according to the invention in an alternative preferred embodiment. Said embodiment is largely identical to the embodiment which is shown in FIG. 1. The corresponding designations also apply to FIG. 2. The difference from FIG. 1 consists in that a resilient connection 48 is provided between the bearing section 14 and the adjustment section 12 instead of the articulated connection 22. In this exemplary embodiment, the resilient connection 48 is realized by way of material weakening and by way of the use of an elastic plastic. Alternative construction principles are known to a person skilled in the art.

Figure 3:
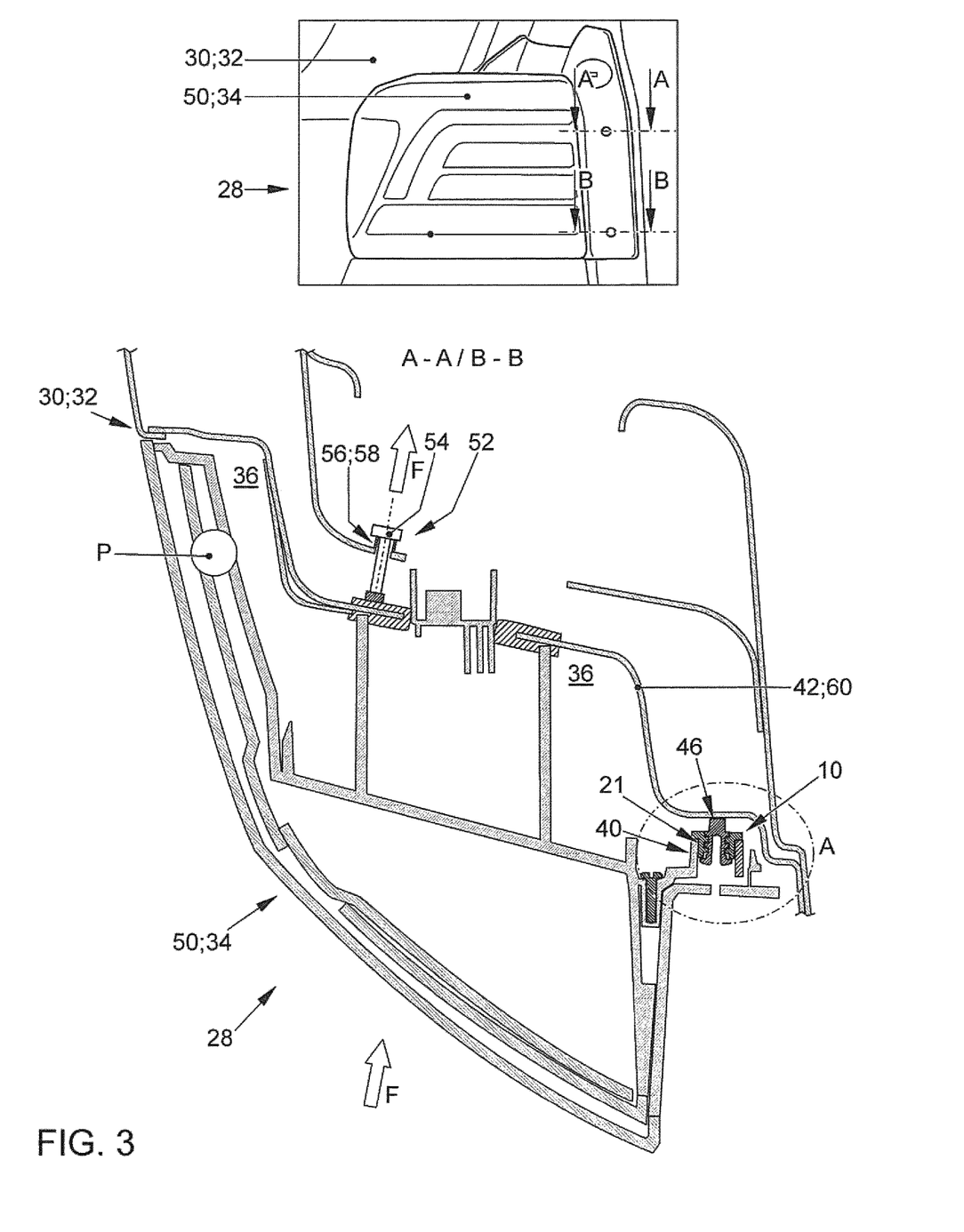
FIGS. 3-5 show a diagrammatic illustration of an illumination arrangement according to the invention for a vehicle in one preferred embodiment.

FIG. 3 shows a diagrammatic illustration of an illumination arrangement 28 according to the invention for a vehicle in one preferred embodiment. The illumination arrangement 28 comprises the adjustment element 10, as shown in FIG. 1. The illumination arrangement 28 can likewise be realized by way of the adjustment element 10, as shown in FIG. 2. Here, the designations which are used in FIG. 1 also apply correspondingly to FIG. 3. The lower part of FIG. 3 shows a sectional view of the illumination arrangement 28. The sectional course is apparent from the upper part of FIG. 3. Two sectional lines A and B are identified there. The associated sectional views A-A and B-B are identical and are therefore shown only once in the lower part of FIG. 3.

A surface 30 of a vehicle (of a motor vehicle 32 here) is indicated there. The illumination arrangement 28 comprises an illumination apparatus 34 as an attachment part 50. Said illumination apparatus 34 is a tail light in this exemplary embodiment. The illumination apparatus 34 is arranged in a receiving section 36 of the surface 30. Furthermore, the illumination arrangement 28 comprises in principle a mount 52, by way of which the illumination apparatus 34 is fastened to the motor vehicle 32 such that it can be moved in one or more degrees of freedom. In this exemplary embodiment, the mount 52 comprises a stud bolt 54 which is fastened firstly to the motor vehicle 32 and secondly to the illumination apparatus 34.

Furthermore, an energy store element 56 is provided. This is a spring 58 in this exemplary embodiment, which spring 58 is arranged on the stud bolt 54. This results in a prestressing force F which acts on the illumination apparatus 34 and in the direction of the motor vehicle 34.

In this exemplary embodiment, the adjustment element 10 is screwed via the external thread 21 into a housing 40 of the illumination apparatus 34. By way of the adjustment element 10, the illumination apparatus 34 is supported against the structural part 42 of the motor vehicle 34 counter to the prestressing force F. Here, the structural part 42 is a vehicle body part 60. As a result of the interaction of the prestressing force F with the supporting action of the adjustment element 10, an undesired angular adjustment W (cf. FIGS. 4, 5) of the illumination apparatus 34 relative to the motor vehicle 32 can occur. In the present case, this is illustrated using a pivot point P, the position of which can vary depending on the configuration of the specific illumination arrangement 28. Here, the pivot point P is therefore shown purely by way of example. In this exemplary embodiment, a resulting movement of the illumination apparatus 34 corresponds to a pivoting action of the illumination apparatus 34 about the pivot point P. The further explanation takes place using FIGS. 4 and 5. Said figures show the detailed region A from FIG. 3.

As can be seen in FIG. 4, the supporting face 46 of the bearing section 14 of the adjustment element 10 bears flatly against the vehicle body part 60. It can be seen clearly that an angular adjustment W is produced by way of the pivoting of the illumination apparatus 34 about the pivot point P. Said angular adjustment W can be compensated for by way of the adjustment element 10, since the bearing section 14 is mounted movably on the adjustment section 12. Therefore, the supporting face 46 always bears flatly against the vehicle body part 60. The angular adjustment W can also occur without pivoting of the illumination apparatus 34 about the pivot point P, for example when the structural part 42 has a spatially twisted design or on account of unavoidable shape and positional deviations in the manufacture and assembly.

Figure 5:
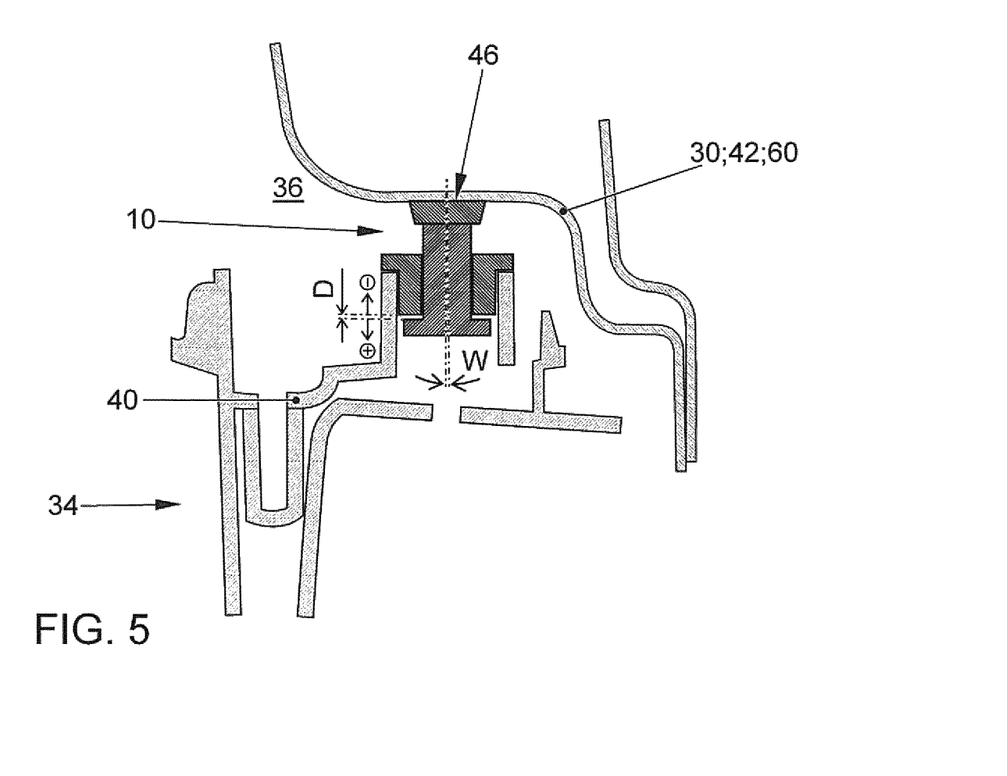

Furthermore, it can be seen in FIG. 4 that the adjustment element 10 can be adjusted along an adjustment travel D. The adjustment is achieved by the adjustable supporting body 18 being screwed into or out of the sleeve 16. This can take place via the tool holder 44 by way of a suitable rotary tool. An adjustment of the adjustment element 10 in +d brings about a movement of the illumination apparatus 34 toward the vehicle body part 60 in the region of the adjustment element 10. An adjustment of the adjustment element 10 in −d correspondingly brings about a movement away from the vehicle body part 60. This corresponds to a movement in sections of the illumination apparatus 34 in the direction of the surface 30 of the motor vehicle 32 or away from said surface 30. It is to be noted that, although the illumination apparatus 34 has become a part of the surface 30 of the motor vehicle 32 after the assembly, this is not yet assumed for the adjustment itself, with the result that the vehicle body part 60 is part of the surface 30 here. In the state which is shown in FIG. 4, the illumination apparatus 34 is moved in +d in the direction of the surface 30 of the motor vehicle 32 as far as a dead center. In the present exemplary embodiment, an adjustment travel D of a total of 4 mm is available. FIG. 5 is largely identical to FIG. 4. The essential difference from FIG. 4 is that the illumination apparatus 34 is moved here away from the surface 30 of the motor vehicle 32 in −d along the adjustment travel D as far as a dead center. An angular adjustment W in the reverse direction occurs here.

Figure 6:
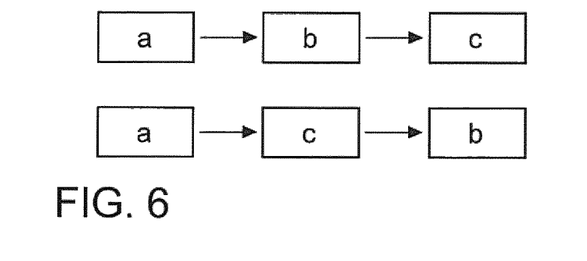
FIG. 6 shows a diagrammatic illustration of a method according to the invention for assembling an illumination apparatus in a vehicle in one preferred embodiment.

FIG. 6 shows a diagrammatic illustration of a method according to the invention for assembling an illumination apparatus 34 in a vehicle in one preferred embodiment. The method for assembling the illumination apparatus 34 comprises a first step a. Here, a pre-assembly of an illumination arrangement 28 for a vehicle takes place. In the present exemplary embodiment, this is an illumination arrangement 28, as described in FIGS. 3 to 5. Therefore, recourse is also made here to the designations of FIGS. 1 to 5 in order to clarify the situation. The upper part of FIG. 6 then describes a first variant of the method. Here, in a second step b, the supporting face 46 of the bearing section 14 of the adjustment element 10 according to the invention is placed against the structural part 42 of the vehicle. In this exemplary embodiment, this is the motor vehicle 32. In a third step c, the adjustment section 12 of the adjustment element 10 is then set. As an alternative, the step c can also take place before the step b, as shown in the lower part of FIG. 6.

Figure 7:
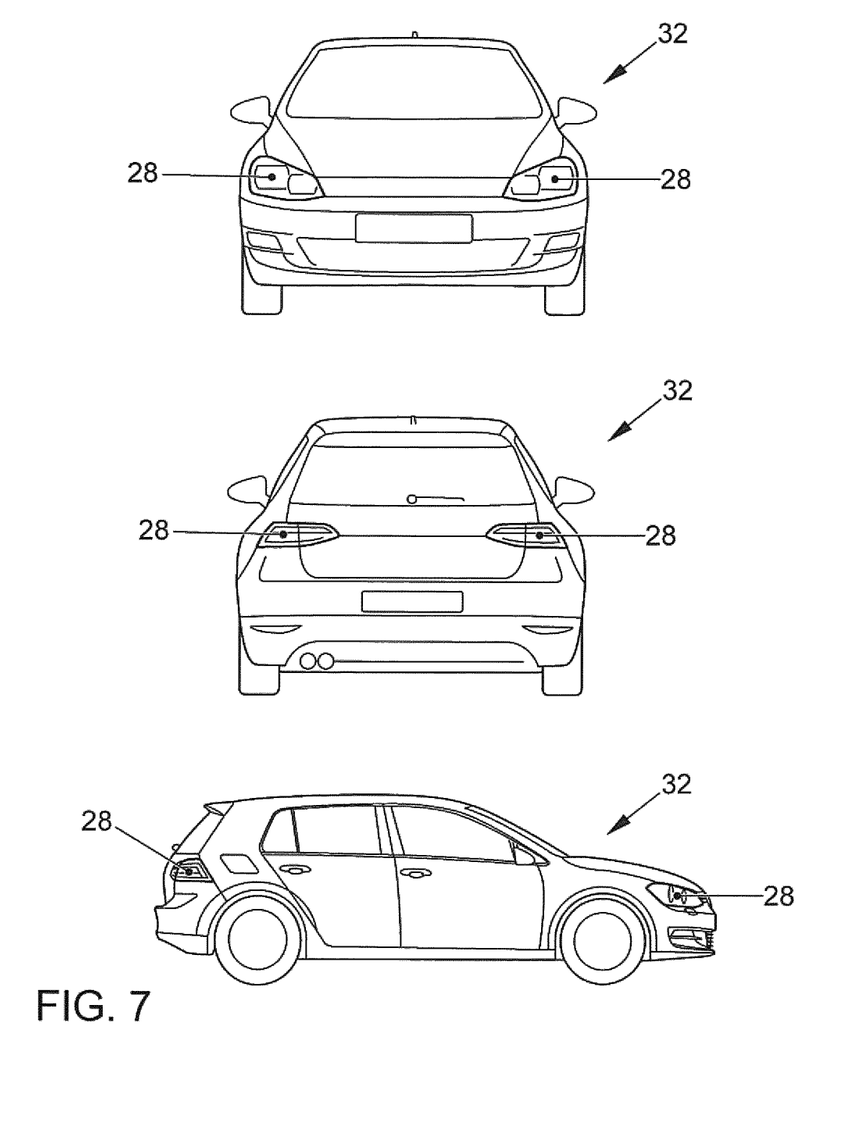
FIG. 7 shows a diagrammatic illustration of a motor vehicle according to the invention in one preferred embodiment.

FIG. 7 shows a diagrammatic illustration of a motor vehicle according to the invention in one preferred embodiment. The upper part of FIG. 7 shows the motor vehicle 32 according to the invention in a front view, the middle part of FIG. 7 shows the motor vehicle 32 in a rear view, and the lower part of FIG. 7 shows the motor vehicle 32 in a side view. The illumination arrangement 28 according to the invention can be provided, for example, in the region of one or more front headlights or tail lights of the motor vehicle 32. However, the illumination arrangement 28 can fundamentally be provided in relation to any desired illumination apparatuses or else other attachment parts 50 which can be situated both in the interior and on the outer surface 30 of the motor vehicle 32.

LIST OF DESIGNATIONS

10 Adjustment element
12 Adjustment section
14 Bearing section
16 Outer section
18 Inner section
20 Internal thread
21 External thread
22 Articulated connection
24 Joint body
25 Joint head
26 Joint body receptacle
27 Joint socket
28 Illumination arrangement
30 Surface
32 Motor vehicle
34 Illumination apparatus
36 Receiving section
40 Housing
42 Structural part
44 Tool holder
46 Supporting face
48 Resilient connection
50 Attachment part
52 Mount
54 Stud bolt
56 Energy store element
58 Spring
60 Vehicle body part
D Adjustment travel
F Prestressing force
P Pivot point
W Angular adjustment

The invention claimed is:

1. An adjustment element, for positioning an attachment part on a structural part of a vehicle, having:
  an adjustment section which can be connected to the attachment part, and
  a bearing section wherein the bearing section is mounted movably on the adjustment section and has a supporting face which can bear against the structural part of the vehicle, wherein the bearing section is fastened to the adjustment section via a resilient connection having a first end connected to the bearing section, a second end connected to the adjustment section, and a middle region located between the first end and the second end, wherein a cross-section of the middle region is smaller than a cross-section of the first end and smaller than a cross-section of the second end.

2. The adjustment element as claimed in claim 1, wherein the bearing section is mounted movably on the adjustment section in such a way that the supporting face can be pivoted with respect to the adjustment section.

3. The adjustment element as claimed in claim 1, wherein the adjustment section comprises:
   a sleeve which can be connected to the attachment part, and
   a supporting body which can be adjusted with respect to the sleeve and on which the bearing section is mounted.

4. The adjustment element as claimed in claim 3, wherein the sleeve has an internal thread and the supporting body has an external thread.

5. The adjustment element as claimed in claim 3, wherein the sleeve can be connected to the attachment part in a positively locking and/or non-positive or integrally joined manner.

6. An illumination arrangement for a vehicle, comprising at least one adjustment element as claimed in claim 1.

7. The illumination arrangement as claimed in claim 6, further comprising:
   an illumination apparatus which can be arranged in a receiving section of a surface of the vehicle;
   a mount, via which the illumination apparatus is mounted on the vehicle such that it can be moved in at least one degree of freedom, and via which said illumination apparatus can be moved at least in sections in the direction of the surface of the vehicle or away from said surface; and in which
   an adjustment section of the adjustment element is connected to the illumination apparatus, and a supporting face of the adjustment section can bear against a structural part of the vehicle.

8. A method for assembling an illumination apparatus in a vehicle, comprising the steps:
   a) assembling an illumination arrangement for a vehicle as claimed in claim 6;
   b) bearing of a supporting face of a bearing section of an adjustment element of the illumination arrangement against a structural part of the vehicle; and
   c) setting of the adjustment section.

9. A motor vehicle, comprising at least one illumination arrangement as claimed in claim 6.

* * * * *